Sept. 23, 1969  B. E. SCHELL, JR  3,468,574
STRUCTURAL LOCK
Filed May 23, 1968
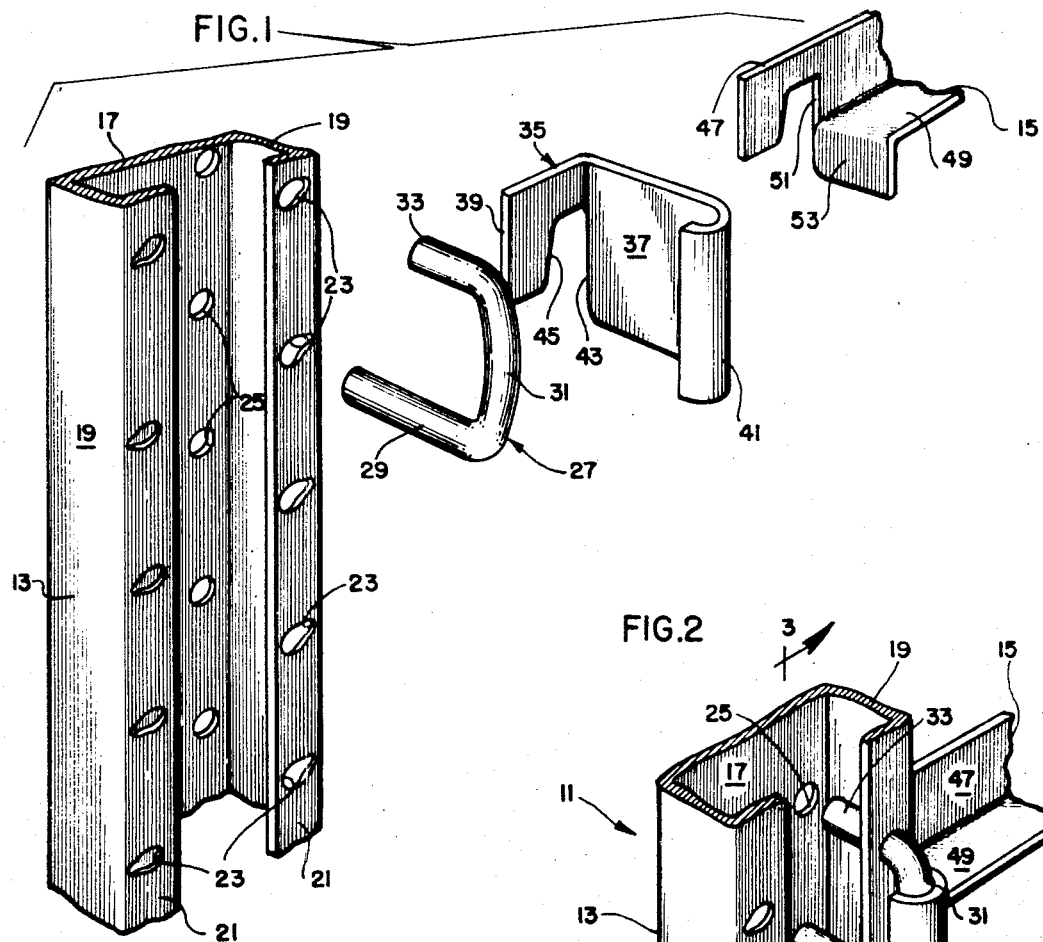
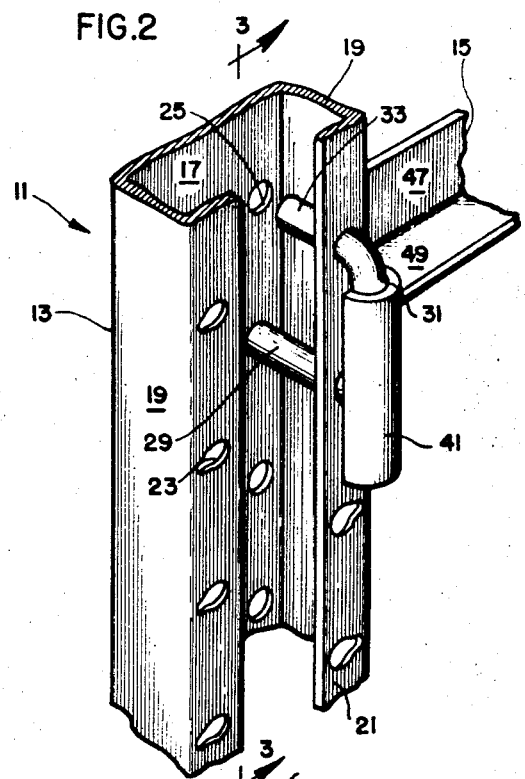
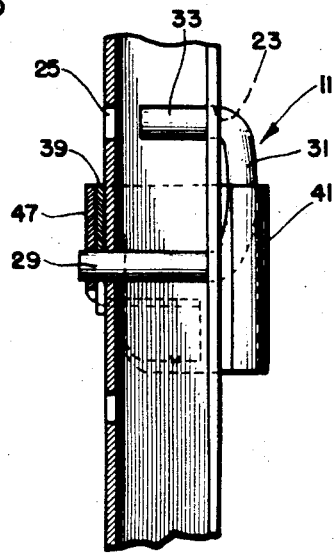
Inventor
BURT E. SCHELL JR.
Anderson, Luedeka, Fitch, Even, & Tabin
Attorneys

United States Patent Office 3,468,574
Patented Sept. 23, 1969

3,468,574
STRUCTURAL LOCK
Burt E. Schell, Jr., Long Grove, Ill., assignor to Speedrack, Inc., Skokie, Ill., a corporation of Illinois
Filed May 23, 1968, Ser. No. 731,408
Int. Cl. F16b 1/00, 3/00, 5/00
U.S. Cl. 287—189.36                10 Claims

ABSTRACT OF THE DISCLOSURE

An improved structural lock for uniting a beam or other horizontal member to a column. A generally J-shaped locking pin inserted into vertically spaced holes in the column at the desired height. The longer section of the pin extends horizontally through the column and protrudes from the other face. A locking plate affixed to the end of the beam spans the column and contains a camming slot which engages the protruding end of the pin and a connector that engages the curved center section of the locking pin. Downward force on the beam causes the locking plate to be drawn into abutting contact with the column in mutually perpendicular directions.

---

This invention relates to a device for interconnecting structural members of a storage rack or the like and more particularly to a detachable structural connection between a column and a horizontal member.

U.S. Patent No. 2,932,368, issued Apr. 12, 1960, illustrates one form of a very satisfactory arrangement for detachably connecting structural members. This structural lock utilizes pin and slot connections perpendicularly disposed to each other and has proved effective in achieving an extremely firm connection between structural members, which connection can be quickly made and readily released. As such, the lock has found ready application in the storage field.

The lock is illustrated in the above-identified patent for use in a storage rack to join a column or vertical structural member with a beam or horizontal structural member and thereby provides a detachable connection the firmness of which increases as the loading of the beam is increased. The lock permits separation of the structural members to be easily accomplished by merely exerting upward pressure on the beam. Although this lock is considered to be excellently suited for structural connections of this type in general, simpler locks are always desired particularly for special purpose applications.

An object of the present invention is to provide an improved locking arrangement for connecting structural members used in storage racks or the like. Another object of the present invention is to provide a simple structural locking arrangement especially suited to lightweight applications.

Other objects and advantages of the invention will be apparent by reference to the following detailed description when read in conjunction with the accompanying drawings wherein:

FIGURE 1 is an exploded fragmentary perspective view of a vertical column, a locking pin and cooperating horizontal members of a structural lock embodying various of the features of the invention;

FIGURE 2 is an assembled fragmentary perspective view showing the elements pictured in FIGURE 1 in the locked position; and FIGURE 3 is a vertical section view showing the lock in the locked position, which view is taken along line 3—3 of FIGURE 2.

A structural lock 11 embodying various features of the invention is shown generally in the drawings at it might be used to interconnect a vertical structural member or column 13 with a horizontal structural member or beam 15. As one application, the lock 11 might be incorporated in any of the various types of storage racks presently manufactured. The lock 11 might similarly be used as a part of a scaffold or other similar structure where detachability of the connection is of importance.

The illustrated column 13 has the general shape of a deep channel, the end portions of the flanges of which are inturned to provide a member which is generally C-shaped in cross section. It should be apparent from an understanding of the invention that other suitable column shapes might be employed. For example, a column of circular cross section might be used, particularly if it is desired to use only one structural connection at the same vertical location. The illustrated column 13 includes a web 17 flanked by flanges 19, the end portions 21 of which are inturned. Each of the inturned flanged portions 21 is perforated with suitable apertures 23 in the form of circular holes. Aligned with the holes 23 in the inturned flanged portions are apertures 25, in the form of circular holes, in the web 17. As can be seen from the drawings, the holes 23 and 25 are uniformly vertically spaced from one another. Thus, it can be seen that the column 13 contains a plurality of pairs of aligned holes 23 and 25, each pair of which provides a passageway transversely through the column. Although only one lock 11 is illustrated in FIGURE 2, it should be understood that the purpose of the duplication of the pairs of holes down each side of the column 13 is to allow two beams to be supported from a column at the same vertical level.

The detachable connection is made via a locking pin 27 which is releasably located at the desired vertical level on the column 13. The locking pin 27 is formed with a first pin section 29 of sufficient length when inserted through an aperture 23 to extend transversely through the column and out the aperture 25, protruding a sufficient distance past the web 17 to facilitate its engagement by a connector. The illustrated locking pin 27 has the general shape of a J and is bent from a piece of round bar stock to provide a slightly curved or bowed section or part 31 extending from the end of the pin section 29. At the end of the center curved section 31, another straight pin section 33 is provided. Pin section 33 is parallel to pin section 29 and spaced therefrom a sufficient distance to be aligned with the next pair of holes 23 and 25 either above or below the holes wherein the pin section 29 is inserted. In its preferred inserted location, the pin section 33 lies directly vertically above the pin section 29 and maintains the curved section 31 with a stable vertical orientation. The locking function of the pin 27 in the illustrated embodiment is generally the same whether the pin section 33 is positioned above or below the pin section 29; however, as explained hereinafter, the pin section 33 is preferably positioned thereabove.

At the end of each beam 15 there is attached a locking plate 35 which is designed to releasably engage the locking pin 27 at locations on transversely opposite sides of the column 13 to establish the structural lock 11. Moreover, the angle plate 35 is designed to engage the pin 27 with two camming connections which are designed to draw the angle plate 35 into firmly abutting relationship with the exterior surface of the column 13 at two locations and in two directions which are substantially perpendicular to one another. More specifically, the locking plate 35 contains a substantially flat central portion 37 of sufficient width to space connectors 39 and 41 (which are formed on opposite sides thereof) a sufficient distance apart so that they will flank the portion of the column wherein the locking pin 27 is disposed. The connector 39 is bent at substantially right angles to the central portion 37 and contains a downwardly open slot 43 that is formed with a camming edge 45. The connector 41 contains a vertically oriented curved portion that is bent in the general shape of one-half of a right circular cylinder having an inner diameter just slightly greater than the diameter of the bar stock from which the locking pin 27 is made.

The illustrated beam 15 has the shape of a piece of angle iron and is adapted to be operatively disposed with one flange 47 extending vertically upward from the other horizontal flange 49 which serves as a suitable support for a shelf or the like in a storage rack. The end of the vertical flange 47 contains an upwardly extending slot 51 similar to the slot 43, and the end of the horizontal flange 49 is bent downward to form a seat 53. In constructing the lock 11, the locking plate 35 is suitably welded to the end of the beam 15 with the seat 53 abutting the adjacent surface of the central section 37 and the slots 51 and 43 in matched alignment with each other.

In making the structural connection, the locking pin 27 is inserted with the pin section 29 extending through the holes 23 and 25 at the desired vertical level and the shorter pin section 33 extending through the hole 23 next thereabove. The beam 15 is then positioned adjacent the column 13 at a location immediately above the pin 27 with the connectors 39 and 41 flanking the web 17 and inturned flange 21, respectively, of the column. As the beam with its affixed locking plate 37 is moved downward, the lower edge of the curved interior wall of the connector 41 engages the curved section 31 of the locking pin 27 and squeezes the curved section 31 between the inturned flange 21 and the connector 41. Accordingly, downward movement of the connector 41 along the outwardly curving surface 31 draws the flat connector portion 39 of the locking plate 37 into tight abutting contact with the web 17 of the column. As downward movement of the beam continues, the protruding end of the pin section 29 is engaged by the camming edge 45 of the connector 39 causing the central section 37 of the locking plate to be drawn into tight abutting contact with the side flange 19 of the column. In the illustrated arrangement, the vertical length of the connector 41 is such that in the lock position it extends slightly past the center or point of greatest outward curvature on the arcuate-shaped section 31 to thus provide a very stable connection at this point.

It should be understood that the dimensions of the locking plate 37 and the locking pin 27 are so proportioned that the continued downward movement of the locking plate generally causes the connection to become more and more firm. The locking plate 37 is preferably formed from steel so there is inherently sufficient resilience in the connector 41 to allow it to deflect outward during the vertical movement, as its lower edge reaches and slides downward along the curved section 31. As a result of this deflection, the pin is squeezed between the connector 41 and the flange 21 in such a stable manner when the lock 11 is established that inadvertent unlocking of the lock is prevented. As should be clear, the provision of the camming movement in two directions which are perpendicular to one another necessarily establishes a very firm lock of the horizontal member or beam 15 to the column 13, and it should be likewise realized that loading of the beam 15 serves to increase the firmness of the lock.

As previously mentioned, the locking pin 27 is preferably disposed with the shorter pin section 33 above the longer pin section 29. This disposition is believed to aid the stability of the connector in resisting inadvertent separation of the beam 15 from the column 17 as a result of, for example, an inadvertent upward blow or the rebound reaction from a sharp downward blow, such as might be caused by dropping a material load on a beam. In the illustrated arrangement, there is physical sliding contact between the connector 41 and the curved pin section 31 over a relatively long distance of movement. As best seen in FIGURE 3, the beam must be raised a distance at least about equal to the height of the connector 41 before there is disengagement of the connector 41 from the curved pin section. Thus, this arrangement which maintains engagement of the connector 41 and the pin section 31 over such a distance substantially diminishes the chance of inadvertent separation.

It should be understood that various modifications which would be obvious to one skilled in the art after viewing the foregoing disclosure are to be considered as coming within the scope of the invention. As previously mentioned, the pin 27 could be positioned with its shorter pin section 33 below the longer pin section 29, and in such an instance, instead of using a curved section 31 as a part of the locking pin 27, the vertically extending portion could be made substantially straight, in which case the connector 41 would be oriented at a slight angle to the vertical so that the connector 41 would move in a slightly camming fashion in much the same manner as does the slot 45. Furthermore, instead of using a curved section 31 to provide the sloping or camming surface, a short straight section that is oriented or sloped obliquely to the pin section 29 may be used. Also, as another alternative to using the bowed section 31 plus the straight section 33 to properly position the pin section 31 so as to cooperate with the connector 41, the locking pin 27 might be made to include an enlarged round or spherical head at the end of the pin section 29 which would be larger than the hole 23 and which would cooperate in a similar manner with the interior surface of a rounded cylindrical connector portion 41 of slightly larger diameter.

Various of the features of the invention are set forth in the claims which follow.

What is claimed is:

1. A structural unit which comprises a first structural member having formed therein a passageway extending transversely therethrough including first aperture means in one exterior surface thereof and second aperature means in an opposite exterior surface thereof, a locking pin having a first pin section for insertion into said passageway through said first aperture means to a position where the end of said pin section protrudes through said second aperture means and exterior of said first structural member, said locking pin having a part at the opposite end of said first pin section which is adapted to abut said first structural member and thereby limit the extent to which said first pin section can be inserted through said passageway, and a second structural member including first and second releasably engaging means spaced apart a distance wider than the transverse width of said first structural member at the location of said passageway and adapted to be disposed in flanking relation thereto so both of said engaging means lie transversely exterior of said first structural member at the location of said first and second aperture means, said second engaging means being adapted for releasable engagement with said protruding portion of said first pin section, and said first engaging means being adapted for releasable engagement with said part of said locking pin which engagement wedges said pin part between said first and second structural members and draws said second structural member transversely into tight abutting contact with said first structural member about the location of said second aperture means thereby establishing a lock.

2. The invention in accordance with claim 1 wherein said pin part includes a section attached to said first pin section which slopes away from the surface of said first structural member in the direction in which said first engaging means moves to effect engagement.

3. The invention in accordance with claim 2 wherein said first engaging means is made of resilient material which deflects slightly when it engages said sloping pin part and remains in a stable deflected disposition in said lock position because said first engaging means in said lock position engages said pin part at a point of greatest outward extension of said pin part.

4. The invention in accordance with claim 1 wherein said pin part is rounded and said first engaging means has an interior surface of the shape of a portion of a circular cylinder which surface engages said rounded pin part.

5. The invention in accordance with claim 4 wherein said pin part is a bowed section, wherein said first structural member has a plurality of spaced first aperture means, and wherein a second pin section is affixed to the end of said bowed section, which second pin section is parallel to and spaced apart from said first pin section a distance the same as the distance of the spacing of said plurality of first aperture means.

6. The invention in accordance with claim 5 wherein said second engaging means includes a camming surface which engages said first pin section and draws said structural members into tight abutting contact in a direction generally perpendicular to the direction of the abutment caused by said first engaging means.

7. A structural unit which comprises a column having formed therein a plurality of vertically spaced passageways extending horizontally therethrough and each including first aperture means in one exterior surface thereof and second aperture means in an opposite exterior surface thereof, a locking pin having a first pin section for insertion horizontally into one of said passageways through said first aperture means to a position where the end of said pin section protrudes through said second aperture means and exterior of said column, said locking pin having a part at the opposite end of said first pin section which is adapted to abut said column and thereby limit the extent to which said first pin section can be inserted through said passageway, and a horizontal structural member including first and second releasably engaging means spaced horizontally apart a distance wider than the transverse widgth of said column at the location of said passageways and adapted to be disposed in flanking relation thereto with both of said engaging means lying horizontally exterior of said column at about the location of said first and second aperture means, said second engaging means being adapted for upward and downward releasable engagement with said protruding portion of said first pin section, and said first engaging means being adapted for upward and downward releasable engagement with said locking pin part, the downward engagement wedging said pin part between said column and said first engaging means and drawing said horizontal structural member transversely into tight abutting contact with said column about the location of said second aperture means.

8. The invention in accordance with claim 7 wherein said pin part slopes downward and away from the surface of said column and wherein said first engaging means is made of resilient material which deflects slightly when it engages said sloping pin part and remains in a stable deflected disposition in said lock because said first engaging means engages said pin part at a location of greatest outward extension of said pin part in lock position.

9. The invention in accordance with claim 7 wherein said pin part is bowed and of circular cross section and said first engaging means has an interior surface of the shape of a portion of a vertically oriented circular cylinder which surface engages said bowed pin part and wherein said second engaging means includes a camming surface which engages said first pin section and draws said column and horizontal member into tight abutting contact in a direction generally perpendicular to the direction of the abutment caused by said first engaging means.

10. The invention in accordance with claim 9 wherein a second pin section is affixed to the end of said bowed section, which second pin section is parallel to and spaced apart from said first pin section the same distance as the vertical spacing of said plurality of first aperture means in said column.

References Cited

UNITED STATES PATENTS

| | | | |
|---|---|---|---|
| 2,530,866 | 11/1950 | Evans et al. | 287—189.36 |
| 2,932,368 | 4/1960 | Schell | 287—189.36 |
| 3,186,527 | 6/1965 | Konstant et al. | 287—189.35 |

FOREIGN PATENTS 275,711   12/1965   Australia.

MARION PARSONS, JR., Primary Examiner